United States Patent Office 3,224,951
Patented Dec. 21, 1965

3,224,951
RADIATIVE PROCESSING OF THERMOPLASTIC POLYMERS
Gaetano F. D'Alelio, South Bend, Ind., assignor to Scott Paper Company, Philadelphia, Pa., a corporation of Pennsylvania
No Drawing. Filed July 9, 1962, Ser. No. 208,594
8 Claims. (Cl. 204—158)

This invention is concerned generally with the processing of thermoplastic polymers and their transformation to the insoluble infusible state. In particular, it deals with the vinyl-type polymers containing a 1,2,alkane ketal moiety attached to the backbone of the polymer and the exposure of these polymers to radiant energy to produce an insoluble polymer product.

The monomers from which the polymers used in the practice of this invention are prepared, have a terminal $$\overset{|}{C}H=C\diagup$$

group, and at least one 1,2,alkane ketal group, $$\begin{array}{c}-CH-CHR'\\ \diagdown O\quad O\diagup \\ R''-C-R''\end{array}$$

attached to the $$\overset{|}{C}H=\overset{|}{C}-$$

group, wherein R' represents H and R'', and R'' represents an alkyl radical containing one to two carbon atoms. The polymers before irradiation are thermoplastic linear polymers of the structure, $$-(CH-\overset{Y}{\underset{|}{C}})_n-\\ \overset{|}{C}HCH_2\\ \diagdown O\quad O\diagup\\ R''-C-R''$$

wherein Y represents H, —CH$_3$, —Cl, —Br, CN, COOR, and in which the alkane ketal moiety is attached to the polymer backbone. This ketal moiety can be attached in numerous ways and the manner in which it is attached is not critical; the only requirement for the polymers used in the practice of this invention is that the polymer contains at least one alkane ketal moiety in its structure, although a plurality of ketal moieties is preferred.

Some illustrative examples of the polymers used in the practice of this invention include those derived from the monomeric itaconic esters disclosed and claimed in my copending application, Serial No. 208,593, filed July 9, 1962. These itaconic esters having the formula $$\begin{bmatrix}CH_2=CCOO-\\ |\\ CH_2COO-\end{bmatrix}\begin{matrix}-R\\ -R'\end{matrix}$$

in which R represents H, a saturated aliphatic hydrocarbon radical, an olefinic unsaturated hydrocarbon radical, said radicals containing one to eight carbon atoms, and R'; R' represents an alkylene dioxolane radical of the structure $$-(CH_2)_nCHCH_2\\ \diagdown O\quad O\diagup\\ R''-C-R''$$

wherein $n$ is an integer having a value of one to four and R'' represents an alkyl radical containing one and two carbon atoms, e.g., methyl and ethyl radicals. These new monomeric esters are the itaconic acid esters of the alpha,beta cyclic ketals of alpha, beta, omega alkane triols containing three to six carbon atoms in the alkane chain having the formula $$HO(CH_2)_nCHCH_2\\ \diagdown O\quad O\diagup\\ R''-C-R''$$

wherein $n$ is an integer having a value of one to four. Thus, the new monomers of this invention are the itaconic esters of the 1,2 ketals of 1,2,3 propane triole; 1,2,4 butane triol; 1,2,5 pentane triol; and 1,2,6 hexane triol.

Itaconic acid is a dicarboxylic acid, and accordingly mono- and di-esters of the alcohols, $$HO(CH_2)_nCHCH_2\\ \diagdown O\quad O\diagup\\ R''-C-R''$$

can be prepared and utilized in the practice of this invention.

Because of commercial availability and other economic factors, the itaconic esters of 1,2 ketal of 1,2,3 propane triol, corresponding to the formula $$\begin{bmatrix}CH_2=C-COO-\\ |\\ CH_2COO-\end{bmatrix}\begin{matrix}-R\\ -CH_2CHCH_2\\ \diagdown O\quad O\diagup\\ R''-C-R''\end{matrix}$$

are preferred.

In the monoesters, the remaining carboxylic group may be left unesterified or may be converted to another ester group containing one to eight carbon atoms as represented by R hereinabove. Illustrative examples of the aliphatic hydrocarbon radical R containing one to eight carbon atoms are methyl, ethyl, propyl, butyl, amyl, hexyl, heptyl and octyl, which may be linear or branched, such as isopropyl, secondary butyl, isoamyl, secondary octyl, vinyl, isopropenyl, allyl, methallyl, buten-2-yl-4, penten-2-yl-4, 5 methyl penten-1-yl-5, 4 ethyl hexen-1-yl-4, 4 methyl hepten -1-yl-4, octen-1-yl-8, etc.

The itaconic esters may be prepared by a number of methods. One convenient method is to use itaconic anhydride and the desired alcohol in accordance with the reaction $$CH_2=C-CO\\ |\quad\quad\diagdown O + HO(CH_2)_nCHCH_2 \longrightarrow\\ CH_2CO\diagup\quad\quad\quad\diagdown O\quad O\diagup\\ \quad\quad\quad\quad\quad\quad R''-C-R''$$

$$\begin{bmatrix}CH_2=C-COO-\\ |\\ CH_2COO-\end{bmatrix}\begin{matrix}-H\\ -(CH_2)_nCHCH_2\\ \diagdown O\quad O\diagup\\ R''-C-R''\end{matrix}$$

This esterification reaction using the anhydride may be performed simply by melting together the two reactants; but preferably to avoid ketone elimination or other side reactions, the esterification is performed in an inert solvent such as heptane, hexane, benzene, toluene, dioxane, tetrahydrofurane, etc., and isolating the product. The monoester thus formed can be used as such for the preparation of polymers and copolymers, or may be used as an intermediate in the preparation of diesters by conversion to an alkali metal salt, such as the sodium, potassium, lithium salt, and reacting the salt with a dialkylsulfate, thus $$\begin{bmatrix}CH_2=C-COO-\\ |\\ CH_2COO-\end{bmatrix}\begin{matrix}-Na\\ -R'\end{matrix} + R_2SO_4 \longrightarrow$$

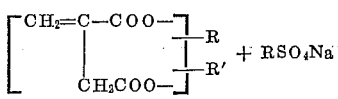

These esters can be prepared also from itaconic acid, or the lower alkyl esters thereof, and the cyclic ketal of the alkane desired in accordance with the general reaction:

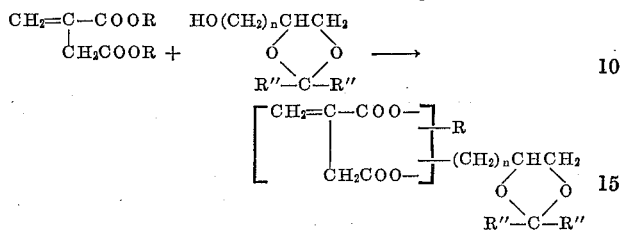

and

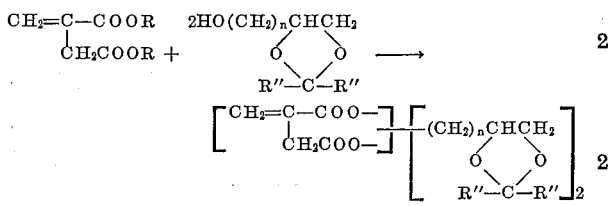

The preferred embodiment of R is methyl and ethyl in this reaction.

Alternately, the mono- and di-acid chloride of the itaconic acid can be used in preparing the new monomers, in the presence of a hydrohalide acceptor (HAC), such as tributyl amine, sodium carbonate, etc., thus

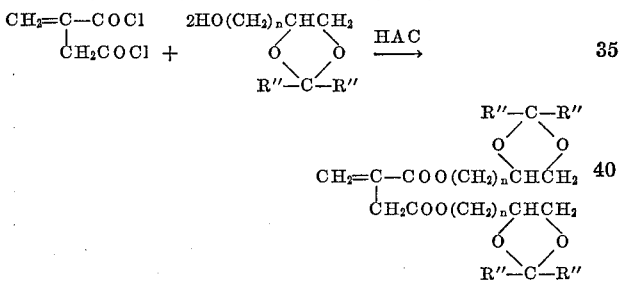

and

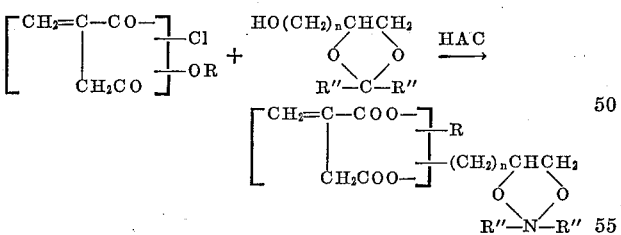

The specific method used in the preparation of the monomer depends in most cases on the monomer desired; for example, when the acid monoester is desired, the method using the anhydride is preferred; when a symmetrical diester is desired then either the acid dichloride or the dimethyl or the diethyl ester is reacted with the cyclic ketal of the alkane triol, and when a mixed ester, that is, an itaconic ester containing a lower alkyl group together with the cyclic ketal ester groups is desired, then the lower alkyl monoester acid chloride, or a lower alkyl diester is reacted with the cyclic ketal of the triol as indicated in the reactions hereinabove.

Another class of polymers suitable for the practice of this invention includes the polymerized ethylene dicarboxylic esters disclosed and claimed in my copending application, Serial No. 208,592, filed July 9, 1962. These ethylene dicarboxylic esters have the formula

CHCOOR
‖
CHCOOR′ in which R represents H, a saturated aliphatic hydrocarbon radical, an olefinic unsaturated hydrocarbon radical, said radical, containing one to eight carbon atoms, and R′; R′ represents an alkylene dioxolane radical of the structure

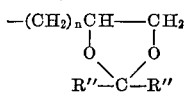

wherein $n$ is an integer having a value of one to four and R″ represents an alkyl radical containing one and two carbon atoms, e.g., methyl and ethyl radicals. These new monomeric esters are the 1,2 ethylene dicarboxylic acid esters of the alpha,beta cyclic ketals of alpha, beta, omega alkane triols containing three to six carbon atoms in the alkane chain having the formula

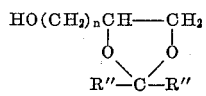

wherein $n$ is an integer having a value of one to four. Thus, these new monomers are the esters of the 1,2 ketals of 1,2,3 propane triol; 1,2,4 butane triol; 1,2,5 pentane triol; and 1,2,6 hexane triol. These 1,2 ethylenic dicarboxylic acid esters are derivatives of maleic and fumaric acids.

Maleic and fumaric acids are dicarboxylic acids, and accordingly mono- and di-esters of the alcohols,

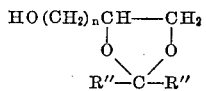

may be prepared and utilized in the practice of this invention.

Because of commercial availability and other economic factors, the maleic and fumaric esters of 1,2 ketal of 1,2,3 propane triol, corresponding to the formula

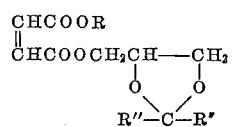

are preferred.

In the monoesters, the remaining carboxylic group may be left unesterified or may be converted to another ester group containing one to eight carbon atoms as represented by R hereinabove. Illustrative examples of the aliphatic hydrocarbon radical R containing one to eight carbon atoms are methyl, ethyl, propyl, butyl, amyl, hexyl, heptyl and octyl, which may be linear or branched, such as isopropyl, secondary butyl, isoamyl, secondary octyl, vinyl, isopropenyl, allyl, methallyl, buten-2-yl-4, penten-2-yl-4, 5 methyl penten-1-yl-5, 4 ethyl hexen-1-yl-4, 4 methyl hepten-1-yl-4, octen-1-yl-8, etc.

These esters may be prepared by a number of methods similar to the preparation of the itaconic esters. One convenient method is to use maleic anhydride and the desired alcohol in accordance with the reaction

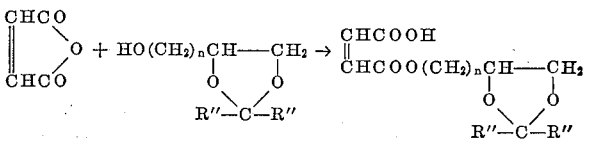

This esterification reaction using the anhydride may be performed simply by melting together the two reactants; but preferably to avoid ketone elimination or other side reactions, the esterification is performed in an inert solvent such as heptane, hexane, benzene, toluene, dioxane, tetrahydrofurane, etc., and isolating the product. The monoester thus formed can be used as such for the preparation of polymers and copolymers, or may be used as an intermediate in the preparation of diesters by conversion to an alkali metal salt, such as the sodium, potassium, lithium salt, etc., and reacting the salt with a dialkylsulfate, thus

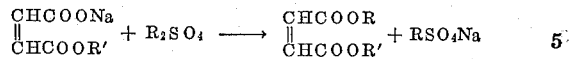

These esters can be prepared also from maleic and fumaric acids, or the lower alkyl esters thereof, and the cyclic ketal of the alkane desired in accordance with the general reaction

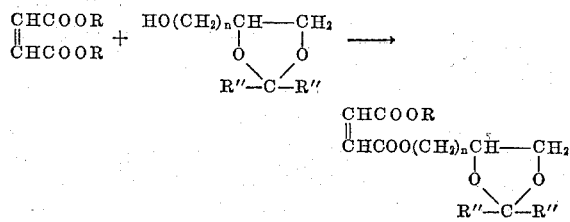

and

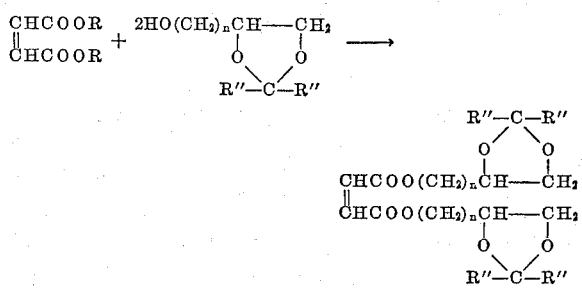

The preferred embodiment of R is methyl and ethyl in this reaction.

Alternately, the mono- and di-acid chloride of the dicarboxylic acids can be used in preparing the new monomers, in the presence of a hydrohalide acceptor (HAC), such as tributyl amine, sodium carbonate, etc., thus

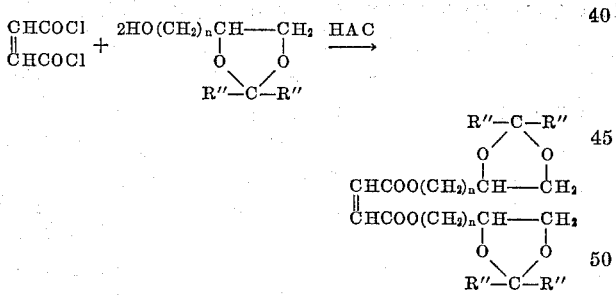

and

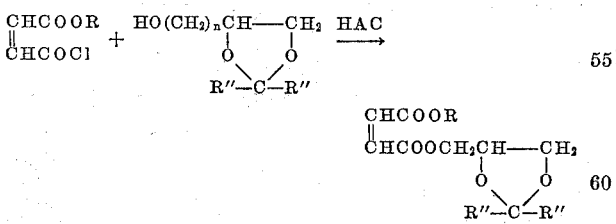

The specific method used in the preparation of the monomer depends in most cases on the monomer desired; for example, when the acid monoester is desired, the method using the anhydride is preferred; when a symmetrical diester is desired then either the acid dichloride or the dimethyl or the diethyl ester is reacted with the cyclic ketal of the alkane triol, and when a mixed ester, that is, maleic or fumaric ester containing a lower alkyl group together with the cyclic ketal ester group is desired, then the lower alkyl monoester acid chloride, or a lower alkyl diester is reacted with the cyclic ketal of the triol as indicated in the reactions hereinabove.

Another class of polymers useful in the exercise of this invention are prepared from monomers which are disclosed in U.S. Patent 2,680,735 as having the formula

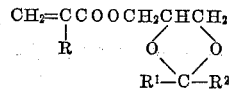

wherein R represents a hydrogen atom or a methyl group and $R^1$ and $R^2$ each represents a hydrogen and alkyl, cycloalkyl and aryl radicals containing one to twelve carbon atoms, and in U.S. Patent 2,877,215 as having the formula

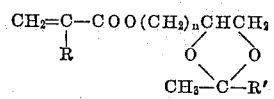

in which $n$ is an integer of 1–4 inclusive, R is H or $CH_3$ and R' is $CH_3$ or $C_2H_5$. These esters are indicated in these patents as being prepared preferably by the reaction,

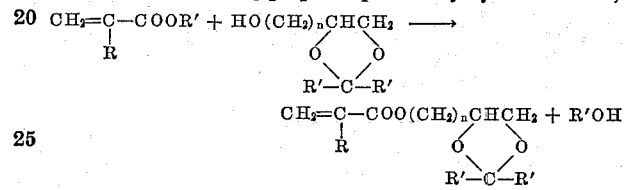

They also may be prepared as shown in the examples hereinafter by using the acid chloride in the presence of a hydrohalide acceptor, thus

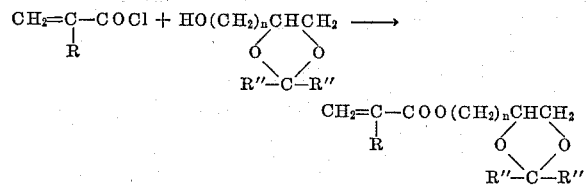

In a similar manner when other monomeric acid chlorides are used, then the corresponding monomers containing attached alkane ketal moieties are obtained, thus

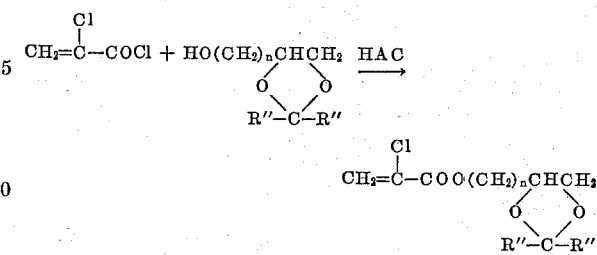

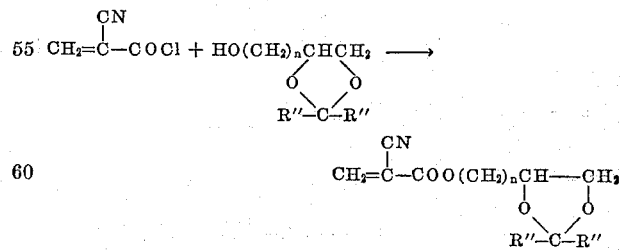

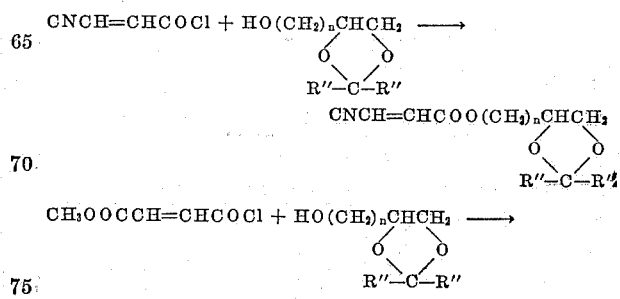

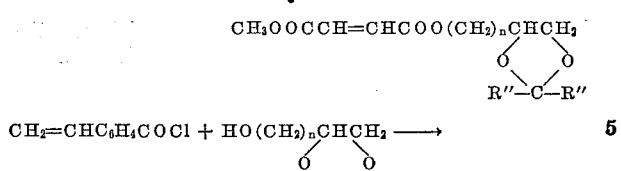

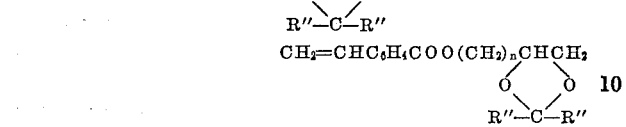

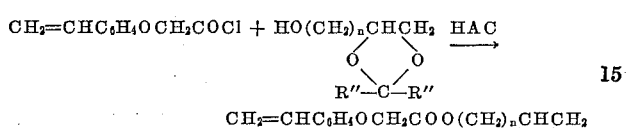

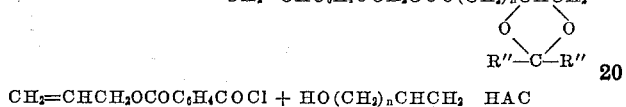

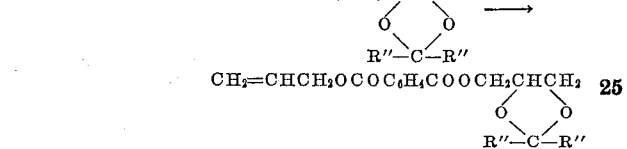

In the above examples, instead of using the alcohols

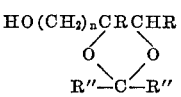

there can be used the alkylene oxide addition products of these alcohols, e.g.

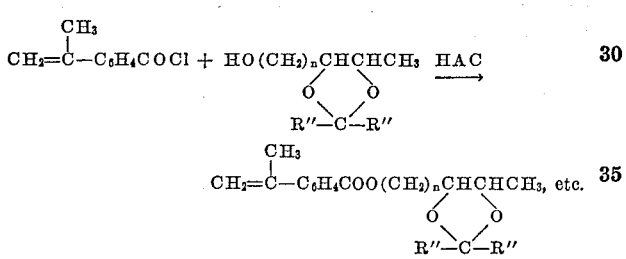

and

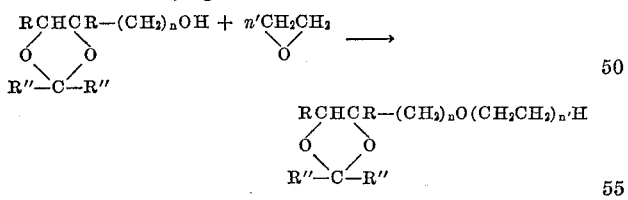

and

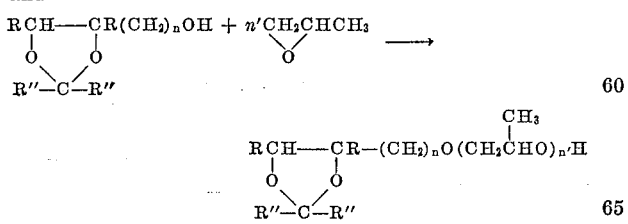

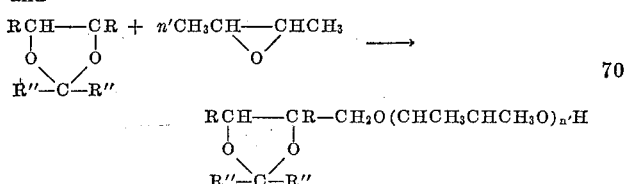

in which case the esters of hydroxyalkoxy monomers are obtained, for example,

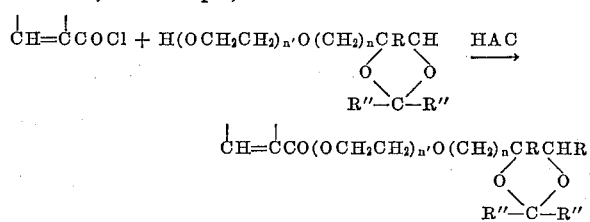

The alkane ketal moiety can also be attached to the polymerizable $$-\overset{|}{C}=\overset{|}{C}-$$

structure of the monomer through bonds other than the ester bonds, as for example through carbon, oxygen, sulfur, amino etc., bonds, as illustrated in the following monomers:

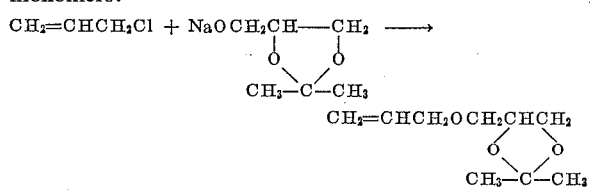

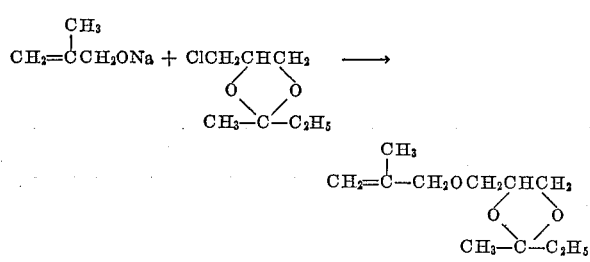

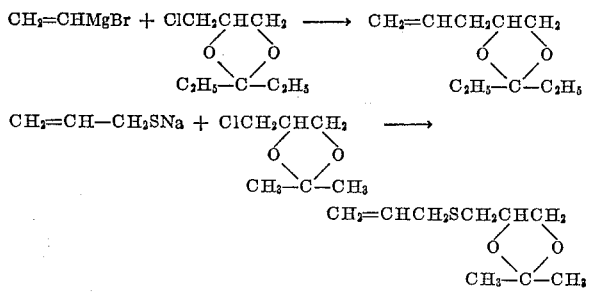

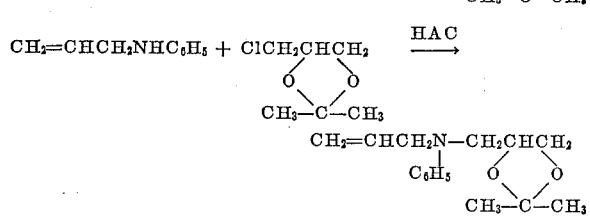

Monomers of the types listed hereinbefore that contain a cyclic alkane ketal moiety can be polymerized to form homopolymers or copolymers from a mixture of two or more of these ketalized monomers or copolymers from one or more of these ketalized monomers with other monomers containing a vinyl, $CH_2=CH-$, a vinylidene, $CH_2=C<$ or a vinylene.

$$\overset{CH=CH}{\underset{|\quad\quad|}{}}$$

group.

Illustrative examples of other monomers containing such groups are the acrylic esters such as methyl acrylate, ethyl acrylate, hexyl acrylate, allyl acrylate, phenyl acrylate, benzyl acrylate, methyl-alpha-chloroacrylate, etc.;

the methacrylic esters such as methyl methacrylate, ethyl methacrylate, propyl methacrylate, methallyl methacrylate, ethylene dimethacrylate, etc.; the vinyl esters such as vinyl chloride, vinyl acetate, vinyl stearate, vinyl benzoate, vinyl chloroacetate, divinyl phthalate, divinyl succinate, etc.; the polymerizable amides and nitriles such as acrylamide, hydroxymethylacrylamide, methacrylamide, itaconic monoamides, itaconic diamide, acrylonitrile, methacrylonitrile, etc.; the alkenyl aryl compounds such as styrene, o-methyl styrene, p-methyl styrene, alpha-methyl styrene, the chlorostyrenes, divinyl benzene, diallyl benzene, etc.; the mono- and polyallyl esters such as allyl acetate, diallyl succinate, diallyl phthalate, diallyl maleate, diallyl fumarate; the vinylidene compounds such as vinylidene chloride, vinylidene cyanide, methylene malonic esters, etc.; vinylene compounds such as vinylene carbonates, maleic anhydride, maleic monoesters and maleic diesters; the itaconic compounds such as itaconic anhydride, the itaconic mono- and the itaconic diesters of the lower and higher aliphatic alcohols; the dienes such as butadiene, isoprene, 2-chloro-butadiene 1,3, etc. The proportion of the new monomers in copolymers with other monomers will depend, in accordance with the accepted principles of copolymerization, on the reactivity and selectivity constants of the comonomers used in preparing the copolymer, the ratio of the monomers used and the extent of conversion. However, by selecting appropriate conditions for the copolymerization, copolymers, using the ketalized monomers as have been described, can be made to contain effective and small amounts of these monomers, for example, of the order of from 0.1% to 0.5% to very high amounts of the order of 99.5% to 99.9% in the final polymer products.

The ketalized monomers can be polymerized by the known methods used to polymerize acrylic, methacrylic or maleic monomeric compounds. The monomers, in the presence or absence of other polymerizable $>C=C<$ containing monomers, can be polymerized in bulk, solution, emulsion, or suspension with or without polymerization initiators and other modifiers. As polymerization initiators there can be used the per-compounds, such as potassium persulfate, tertiary butyl peracetate, benzoyl peroxide, cumene hydroperoxide, tertiary butyl peroxide, tertiary butyl perbenzoate, hydrogen peroxide with or without ferrous salts, etc.; the axo catalysts such as alpha, alpha'azobis(isobutyronitrile), etc.

In solution polymerization, the medium can be selected from solvents which retain the polymer in solution throughout the polymerization, or can be chosen so that the polymer precipitates when formed and can be selected from the class of aliphatic, cycloaliphatic and aromatic hydrocarbons, esters, ethers, ketones, halogenated hydrocarbons, etc., or mixtures thereof depending on the form in which the polymer is desired. When halogenated hydrocarbons are used they also act as modifiers of the polymerizations. In emulsion polymerization, the emulsifying agent to be used in the aqueous system is selected from the class of fatty acid soaps, salts of sulfonated alkyl benzenes, polyvinyl alcohol, gelatin, polyacrylic acid, salts of styrene-maleic acid polymers, gelatin and the like, which can be used alone or with buffering agents such as sodium acetate, borax, trisodium phosphate and the like. In suspension polymerization, the dispersion agent can be selected from the class of insoluble inorganic carbonates, phosphates and silicates to be used alone or in the presence of minor amounts of deflocculating agents such as sodium dodecylbenzene sulfonate or potassium stearate.

The polymers and copolymers used in the practice of this invention have valuable properties which are attributable to the cyclic ketal structure. U.S. Patent 2,680,735 points out that the acrylates and methacrylates claimed therein are heat convertible and can be changed into crosslinked polymers under the influence of heat and/or a catalyst of the acid or Friedel-Crafts type, such as boron trifluoride and its complexes, with ethers, acids and alcohols, ethyl sulfate, alkyl acid phosphates, p-toluene sulfonic acid, titanium tetrachloride, stannic chloride and the like. U.S. Patent 2,877,215 illustrates the reaction of certain polymers containing dioxolane ester linkages with phosphoric acid to form liquid coating composition by reaction with the ketal ring. I have now discovered that these polymers have an even more valuable property, namely, a high absorption in the ultraviolet light region, that is, the UV transmission is low in the region of 500 to 5000 Angstroms. This absorbed energy corresponding from about 4.0 to about 40 electron volts produces secondary effects, resulting in crosslinked polymers. While the exact mechanism is not exactly understood it is believed that the ultraviolet radiation generates radicals in the system by opening of the ketal ring, thus

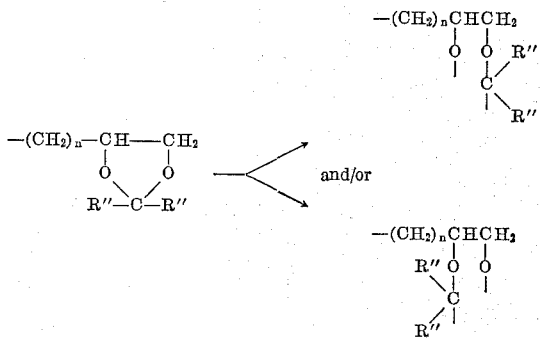

and that these radical structures are responsible for the crosslinking. In photochemical reactions of this type normally one pair of radicals is generated for each photon absorbed. However, due to other reactions the quantum yield may be reduced to 0.5 or even less. This absorption of ultraviolet light is also observable in the monomers containing the cyclic ketal moiety.

That the crosslinking effect of ultraviolet light is due to the presence of the cyclic ketal moiety in the polymer and not to its action on the polymer backbone is readily demonstrable by exposing pairs of related monomers and polymers to ultraviolet light, one not containing a ketal moiety and the other with the moiety, as for example, subjecting monomeric $CH_2=CHCOOCH_3$ vs.

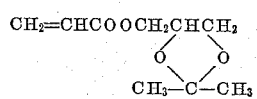

and

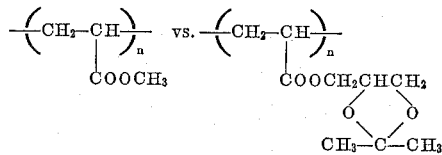

to ultraviolet radiation. In both cases the monomer and polymer containing the cyclic ketal moieties crosslink while the methyl acrylates do not.

It has been proposed, as in U.S. Patent 2,680,735, that ultraviolet light and a catalyst can be used to make polymers from the monomers claimed therein. When monomeric methyl acrylate was polymerized for one hour with an ultraviolet source from a mercury lamp emitting 17,000 photons per hour, only a soluble fusible polymer is obtained, whereas when

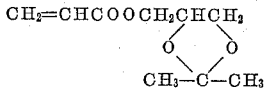

was polymerized under the same conditions, I discovered that since the polymer obtained was in the form of an insoluble and infusible gel, and highly swollen with unpolymerized monomers, useful solutions for coating, etc., could not be prepared, nor could the polymer be molded. This production of a three-dimensional gel is attributable to the formation of polyfuctional radicals, thus

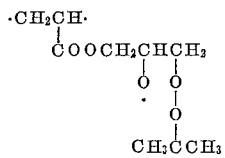

and for that reason, polymerization of the monomers to polymers and copolymers with ultraviolet light is undesirable and to be avoided.

For the purposes of this invention, the monomers containing cyclic ketal moities with or without comonomers are polymerized by free radical catalysts in amounts between 0.01% to 5%, preferably from 0.01 to 1.5% based on the weight of the polymerizable monomers and at temperatures from about 0° C. to about 100 to 110° C. Polymerization temperatures will depend on the monomer or mixture of monomers and in any case, are to be selected and controlled in order to avoid thermally induced crosslinking. It may be seen, therefore, that it is the main purpose of this invention to use preformed, soluble, fusible, thermoplastic polymers, regardless of how they are prepared providing they contain a

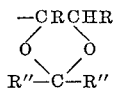

group and to effect crosslinking by treating such preformed polymers with ultraviolet light. These preformed, thermoplastic polymers may be in the form of sheets, rods, blocks, slabs, molded forms and objects, or they may be in the form of films or coatings deposited from solution and emulsions. By masking part of the preformed polymer before ultraviolet light radiation a very small or major part of the polymer may be irradiated, and only that part exposed to the light will be crosslinked, leaving the unexposed areas still soluble, and susceptible of removal with solvents. By the use of this technique printing plates are readily manufactured. Through the practice of this invention, insoluble infusible fibers and films are readily prepared also. For example, fibers spun from a dimethyl formamide solution of a tripolymer of 80 parts acrylonitrile, 10 parts of methyl methacrylate and 10 parts of

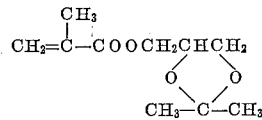

become insoluble in DMF when irradiated by the process of this invention. It is obvious from these descriptions that if the initial polymer is crosslinked it cannot be formed into such useful products, and therefore must be thermoplastic before the ultraviolet light treatment.

Before irradiation, the polymer may be modified or compounded with dyes, pigments, plasticizers, lubricants, antioxidants, blends with other polymers, etc. In many cases, ultraviolet activators such as the uranyl salts, benzophenone, autophenone, acetone, autoacetic esters, etc., can also be compounded with the polymers.

The following examples illustrate the practice of the invention including the synthesis of the monomers, polymers, and copolymers and are not given by way of limitation but by way of illustration. The parts and percentages given are parts and percentages by weight unless otherwise specified.

*Example I*

There were combined in 200 parts of benzene, 28.0 parts of itaconic anhydride and 34.0 parts of glyceryl ketal,

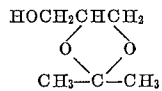

in a reaction vessel equipped with stirrer, condenser, and heating means, and the mixture heated at 60° C. for 48 hours, or at reflux for 15 hours, following which it is cooled to room temperature. The desired ester on evaporation of the solvent under reduced pressure remains as a colorless or light colored oil in an almost quantitative yield and on standing crystallizes. The ester product on recrystallization from ether has a M.P. of 66–68° C.

Elemental analysis for C and H gives values of 53.8% and 6.4% respectively, which is in excellent agreement with the calculated values of 54.1% and 6.56% respectively, for the compound, 4-(2,2-dimethyl-dioxolane-1,3), methylene hydrogen itaconate, corresponding to the formula of

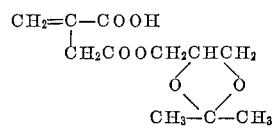

*Example II*

The procedure of Example I is repeated using an equivalent amount of the 1,2 ketal of 1,2,6 hexanetriol instead of glyceryl ketal, and there is obtained an itaconate represented by the formula

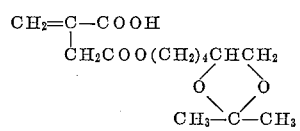

which on analysis for C and H and acid number determination gives values in close agreement with the theoretical values for the compound.

*Example III*

In a well-stirred reaction vessel containing 200 parts of benzene and 24.4 parts of the monomer of Example I is added 4.0 parts of NaOH in 50 parts of ethyl alcohol to form the sodium salt. To this mixture is added slowly over a period of one hour 12.6 parts of dimethyl sulfate and the mixture heated at 60–70° C. for two hours, following which it is allowed to cool at room temperature and filtered to remove solid salts. The benzene solution is washed with dilute aqueous sodium carbonate solution and with distilled water until neutral; then dried with anhydrous sodium sulfate which is removed by filtration. The benzene solution containing the crude ester is treated with activated carbon, filtered and concentrated at a reduced pressure of 15–30 mm., leaving the ester as a colorless viscous oil distillation of which is not possible without the pyrolytic elimination of $CH_3COCH_3$ and other products. Elemental analysis of the viscous oil gives values of 55.32% C and 6.89% H, which is in good agreement with the calculated values of 55.81% C and 6.95% H for the compound

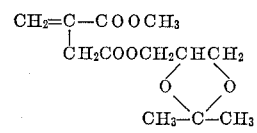

When an equivalent amount of diethyl sulfate is used instead of dimethyl sulfate in this procedure, then the corresponding ethyl ester is obtained, as

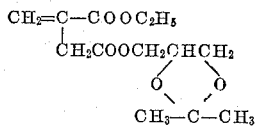

*Example IV*

To a reaction vessel equipped with stirrer, condenser and inlet containing 1600 parts of benzene, 264 parts of glyceryl ketal, and 205 parts of triethyl amine and cooled to 0.5° C. is slowly added over a period of five hours 167 parts of fumaryl chloride in 135 parts of benzene, following which the reaction mixture is allowed to come to room temperature during a period of five hours. The mixture is filtered to remove $(C_2H_5)_3N.HCl$ and the filtrate washed with dilute aqueous $Na_2CO_3$ solution until slightly alkaline and then with distilled water until neutral. The benzene solution of the ester is dried overnight over anhydrous $Na_2CO_3$, filtered and the filtrate separated from benzene by distillation under reduced pressure, leaving a clear viscous oil which cannot be distilled at 10 mm. without evidence of the pyrolytic elimination of $CH_3COCH_3$ and other products. Elemental analysis of the residual oil gave values for C and H of 56.8% and 7.18% respectively, which is in good agreement for the calculated values of 57.03% C and 7.26% H for the compound

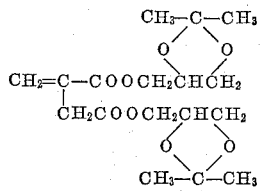

When the glyceryl carbonate of this example is replaced by an equivalent amount of the homologous ketals, such as

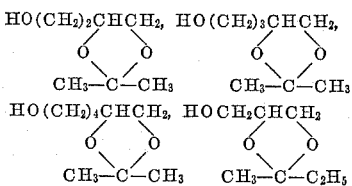

and

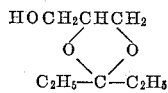

then corresponding itaconic diesters are obtained.

*Example V*

To a reaction vessel equipped with a stirrer, condenser, and inlet is added 1000 parts of toluene, 112 parts of itaconic anhydride, and 130 parts of octyl alcohol and the mixture reacted at reflux for five hours to produce the octyl hemi-itaconate,

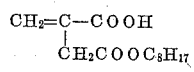

To the reaction mixture then is added 119 parts of thionyl chloride and reflux continued until $SO_2$ and HCl are no longer liberated from the reaction, leaving

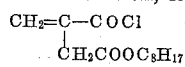

in solution. The reaction solution is cooled to 0.5° C., and there is added slowly over a period of five hours a mixture of 101 parts of triethyl amine and 133 parts of glyceryl ketal in 200 parts of ethyl ether, following which the mixture is allowed to come to room temperature. The mixture is then filtered to remove $(C_2H_5)_3N.HCl$, washed and dried according to the procedure of Example IV, after which the solvent is removed by distillation under reduced pressure, leaving a clear viscous oil which is not distillable at 5 mm. pressure without evidence of pyrolytic eliminations. Elemental analysis for carbon and hydrogen gives values of 63.94% and 8.94% respectively, which is consistent with the formula

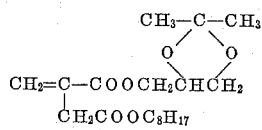

The copolymerization of these itaconic monomers is illustrated by the use of the itaconyl ester of glyceryl ketal of Example I, with a number of monomers such as styrene, vinyl acetate, methylacrylates and methyl methacrylates as examples of monomers containing a $CH_2=C<$ group.

*Example VI*

Styrene and the itaconyl ester of glyceryl ketal of Example I, are mixed in the mole ratios 0.4:1, 0.5:1, 0.6:1, 0.86:1, 1:1, 3:1, 7:1, 10:1, and 15:1 respectively, and sufficient purified acetone added to produce a 20% solution of monomers in solvent. The mixtures were polymerized at 60° C. for 72–96 hours using an amount of benzoyl peroxide equivalent to 0.25% by weight of the monomer as the catalyst, following which they are precipitated by addition of the solution of methanol, isolated by filtration, and dried. The copolymers obtained from these various ratios were soluble in a variety of solvents such as acetone, dioxane, toluene, dimethyl formamide, dimethyl sulfoxide, ethylene carbonate, etc., and can be cast into clear colorless films. When the cast films are subjected at room temperatures and a distance of from 6 to 8 inches to the ultraviolet radiation of a mercury lamp for 10–20 minutes, then insoluble films are obtained.

*Example VII*

Vinyl acetate and the itaconyl ester of glyceryl ketal of Example I are mixed in the mole ratios of 0.35:1, 0.5:1, 0.65:1, 0.90:1, 1:1, 3:1, 7:1, 10:1, and 15:1 and sufficient acetone added to produce a 20% solution of monomer of the solvent. The mixtures were polymerized at 50–60° C. using 1.25% of 2,2'azo-bis-(isobutyronitrile) as the catalyst, and soluble, fusible polymers are obtained which are crosslinked on exposure to ultraviolet light similarly to the polymers of Example VI.

*Example VIII*

Methyl acrylate and the ketalized itaconate of Example I are copolymerized in the mole ratios of the procedure of Example VI and colorless, curable copolymers are similarly obtained, which crosslink when exposed to ultraviolet light.

*Example IX*

Methyl methacrylate and the itaconate of Example I are copolymerized as in Example VIII and clear, colorless copolymers having properties related to the acrylate copolymers are obtained.

As illustrated by the range of ratios of the above various monomer pairs, copolymers of a wide limit of compositions can be readily prepared according to the standard procedures known in the art.

*Example X*

As an illustration of solution copolymerization, 95 parts of styrene, 5 parts of the monomer of Example III,

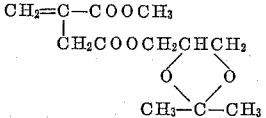

and 200 parts of toluene containing one part of 2,2'azobis-isobutyronitrile are heated in a reactor at 75–80° C. for 36 hours, producing a clear colorless polymer solution useful directly as a coating composition which can be converted to an insoluble product by irradiation with ultraviolet light. A copolymer suitable for molding can be isolated from the toluene solution by precipitation with methyl alcohol.

*Example XI*

The following example illustrates an emulsion polymerization. Vinyl acetate 90 parts, 10 parts of

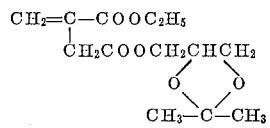

the monomeric ester of Example III, 100 parts of water containing 1.5 parts of polyvinyl alcohol and 0.5 parts of potassium sulfate are heated in a suitable reactor at 75–80° C. for 12 hours producing a latex which can be used directly to impregnate paper and cloth, and when followed by ultraviolet irradiation, the polymer will be insolubilized.

*Example XII*

There were combined in 200 parts of benzene, 27.5 parts of maleic anhydride and 37.0 parts of glyceryl ketal,

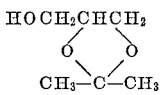

in a reaction vessel equipped with stirrer, condenser, and heating means, and the mixture heated at 60° C. for 48 hours, or at reflux for 15 hours, following which it is cooled to room temperature. The desired ester on evaporation of the solvent under reduced pressure remains as a colorless or light colored oil in an almost quantitative yield. The crude ester has a refractive index of $n_D^{20}=1.6897$.

Elemental analysis for C and H gives values of 51.7% and 6.08% respectively, which is in excellent agreement with the calculated values of 52.2% and 6.46% respectively, for the compound 4-(2,2-dimethyldioxalone-1,3) methylene hydrogen maleate, corresponding to the formula of

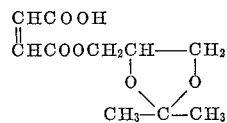

*Example XIII*

The procedure of Example XII is repeated using an equivalent amount of the 1,2 ketal of 1,2,6 hexanetriol instead of glyceryl ketal, and there is obtained the corresponding maleate of the formula

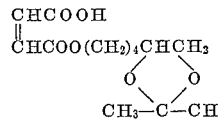

which on analysis for C and H and acid number determination give values in close agreement with the theoretical values for the compound.

*Example XIV*

In a well-stirred reaction vessel containing 200 parts of benzene and 23.0 parts of the monomer of Example XII is added 4.0 parts of NaOH in 50 parts of ethyl alcohol to form the sodium salt. To this mixture is added slowly over a period of one hour 12.6 parts of dimethyl sulfate and the mixture heated at 60–70° C. for two hours, following which it is allowed to cool at room temperature and filtered to remove solid salts. The benzene solution is washed with dilute aqueous sodium carbonate solution and with distilled water until neutral; then dried with anhydrous sodium sulfate which is removed by filtration. The benzene solution containing the crude desired ester is treated with activated carbon, filtered and concentrated at a reduced pressure of 15–30 mm., leaving the ester as a colorless viscous oil at which pressures the oil cannot be distilled without the pyrolytic elimination of $CH_3COCH_3$ and other products. Elemental analysis of the viscous oil gives values of 53.8% C and 6.48% H, which is in good agreement with the calculated values of 54.09% C and 6.55% H for the compound

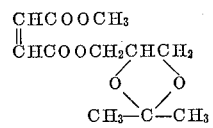

When an equivalent amount of diethyl sulfate is used instead of dimethyl sulfate in this procedure, then the corresponding ethyl ester is obtained, as

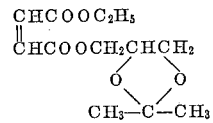

*Example XV*

To a reaction vessel equipped with stirrer, condenser and inlet containing 1600 parts of benzene, 264 parts of glyceryl ketal, and 205 parts of triethyl amine and cooled to 0.5° C. is slowly added over a period of five hours 153 parts of fumaryl chloride in 135 parts of benzene, following which the reaction mixture is allowed to come to room temperature during a period of five hours. The mixture is filtered to remove $(C_2H_5)_3N.HCl$ and the filtrate washed with dilute aqueous $Na_2CO_3$ solution until slightly alkaline and then with distilled water until neutral. The benzene solution of the ester is dried overnight over anhydrous $Na_2CO_3$, filtered and the filtrate free from benzene by distillation under reduced pressure, leaving a clear viscous oil which cannot be distilled at 10 mm. without evidence of the pyrolytic elimination of $CH_3COCH_3$ and other products. Elemental analysis of the residual oil gave values for C and H of 55.4% and 6.68% respectively, which is in good agreement for the calculated values of 55.8% and 6.95% for the compound

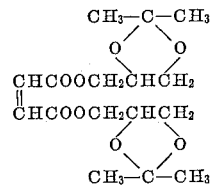

When the glyceryl ketal of this example is replaced by an equivalent amount of the homologous ketals, such as

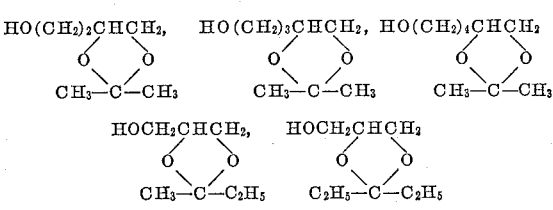

then the corresponding fumaric diesters are obtained.

*Example XVI*

To a reaction vessel equipped with a stirrer, condenser and inlet is added 1000 parts of toluene, 98 parts of maleic anhydride, and 130 parts of octyl alcohol and the mixture reacted at reflux for five hours to produce the octyl hemimaleate

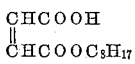

To the reaction mixture then is added 119 parts of thionyl chloride and reflux continued until SO$_2$ and HCl are no longer liberated from the reaction, leaving by isomerization the fumaryl acid chloride,

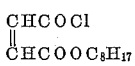

in solution. The reaction solution is cooled to 0.5° C., to which is added slowly over a period of five hours a mixture of 101 parts of triethyl amine and 133 parts of glyceryl ketal in 200 parts of ethyl ether, following which the mixture is allowed to come to room temperature. The mixture is then filtered to remove (C$_2$H$_5$)$_3$N.HCl, washed and dried according to the procedure of Example XV, after which the solvent is removed by distillation under reduced pressure, leaving a clear viscous oil which is not distillable at 5 mm. pressure without evidence of pyrolytic eliminations. Elemental analysis for carbon and hydrogen gives values of 63.08% and 8.76% respectively, which is consistent with the formula

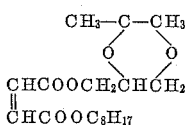

The copolymerization of the maleate monomers is illustrated by the use of the maleyl ester of glyceryl ketal of Example XII, with a number of monomers such as styrene, vinyl acetate, methacrylates and methyl methacrylates as examples of monomers containing a CH$_2$=C< group.

*Example XVII*

Styrene and the maleyl ester of glyceryl ketal of Example XII were mixed in the mole ratios 0.4:1, 0.5:1, 0.6:1, 0.86:1, 1:1, 3:1, 7:1, 10:1, and 15:1 respectively, and sufficient purified acetone added to produce a 20% solution of monomers in solvent. The mixtures were polymerized at 60° C. for 72–96 hours using an amount of benzoyl peroxide equivalent to 0.25% by weight of the monomer as the catalyst, following which they are precipitated by addition of the solution to methanol, isolated by filtration, and dried. The copolymers obtained from these various ratios were soluble as prepared in a variety of solvents such as acetone, dioxane, toluene, dimethyl formamide, dimethyl sulfoxide, ethylene carbonate, etc., and can be cast into clear colorless films. When the clear films are subjected at room temperature to ultraviolet radiation of a mercury lamp spaced therefrom at about 8″ for 10–20 minutes, then insoluble films are obtained.

*Example XVIII*

Vinyl acetate and the maleate ester of glyceryl ketal of Example XII are mixed in the mole ratios of 0.35:1, 0.5:1, 0.65:1, 0.90:1, 1:1, 3:1, 7:1, 10:1, and 15:1 and sufficient acetone added to produce a 20% solution of monomer in the solvent. The mixture was polymerized at 50–60° C. using 1.25%, 2,2′azo-bis(isobutyronitrile) as the catalyst, and soluble, fusible polymers are obtained which are crosslinked on exposure to ultraviolet light similarly to the polymers of Example XVII.

*Example XIX*

Methyl acrylate and the maleate of Example XII are copolymerized in the mole ratios of the procedure of Example XVII and colorless, ultraviolet crosslinkable copolymers are similarly obtained.

*Example XX*

Methyl methacrylate and the maleate of Example XII are copolymerized as in Example XVIII and clear, colorless copolymers having properties related to the acrylate copolymers are obtained.

As illustrated by the range of ratios of the above various monomer pairs, copolymers of a wide limit of compositions can be readily prepared according to the standard procedures known in the art.

*Example XXI*

As an illustration of solution copolymerization, 95 parts of styrene, 5 parts of the monomer of Example XIV,

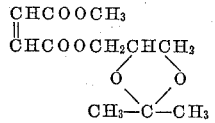

and 200 parts of toluene containing one part of 2,2′azo-bis-isobutyronitrile are heated in a reactor at 75–80° C. for 36 hours, producing a clear colorless polymer solution useful directly as a coating composition on wood. The polymeric film is converted to an insoluble product on exposure to ultraviolet light.

*Example XXII*

The following example illustrates an emulsion polymerization. Vinyl acetate 90 parts, 10 parts of

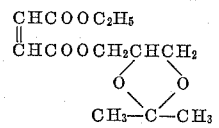

the monomeric ethyl ester of Example XIV, 100 parts of water containing 1.5 parts of polyvinyl alcohol and 0.5 part of potassium sulfate are heated in a suitable reactor at 75–80° C. for 12 hours producing a latex which can be used directly as an adhesive. Films cast from the latex and dried, become insoluble when irradiated with ultraviolet light for 15–30 minutes.

*Example XXIII*

Glyceryl ketal, 111.8 parts, 101 parts of triethyl amine, and 1.5 parts of anthraquinone are added to 1000 parts of benzene in a reaction vessel equipped with stirrer, condenser, and cooling means. The reaction mixture is cooled to 0.5° C. and 90.5 parts of acrylyl chloride in 91 parts of benzene are added slowly over a period of 7–8 hours and the mixture allowed to come to room temperature and the (C$_2$H$_5$)$_3$N.HCl removed by filtration. The benzene solution is washed with dilute Na$_2$CO$_3$ solution until basic and then washed with distilled water until neutral, and dried over anhydrous Na$_2$CO$_3$ and distilled to remove benzene at reduced pressure; B.P. of

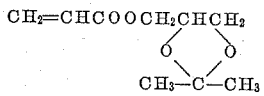

is 59° C. at 0.75 mm. Hg, $n_D^{20}$=1.4425, yield 80%. Elemental analysis for C and H gives values of 57.9% and 7.58% respectively, which is in excellent agreement with the calculated values of 58.05% and 7.58% respectively for the compound.

*Example XXIV*

The procedure of Example XXVIII is repeated using 104.5 parts of methacrylyl chloride instead of the acrylyl chloride and there is obtained the monomer,

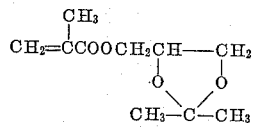

B.P. 68–70° C. at 0.8–1.0 mm., $n_D^{20}$=1.442.

Example XXV

The procedure of Example XXIII is repeated using instead of acrylyl chloride an equivalent amount of

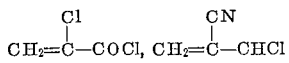

NCCH=CHCOCl, and $CH_2$=$CHC_6H_4COCl$, and the corresponding monomers are obtained.

Example XXVI

Fifty parts each of the monomers of Examples XXIII, XXIV, and XXV are added to 50 parts of toluene containing 1.5 parts of benzoyl peroxide and refluxed under a nitrogen atmosphere for 3 hours, and then one additional part of benzoyl peroxide added and the reflux continued for another 5 hours. Films were made from each of the six solutions by flowing the solutions on glass plates, air drying the coatings initially at room temperature, and then at 80° C. After drying, the films are still soluble in toluene but when the films are irradiated with ultraviolet light they become progressively more insoluble in toluene.

I claim:

1. The process of decreasing the solubility of a thermoplastic polymer comprising an unsaturated carboxylic acid ester of a substituted alkylene dioxolane, which comprises subjecting said polymer to a radiant energy source in the 500 to 5000 angstrom region, wherein the polymer is the polymerization product of a mixture comprising a monomeric ester having a formula

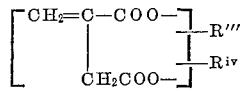

in which $R'''$ is selected from the group consisting of H, saturated aliphatic hydrocarbon radicals containing from one to eight carbon atoms and $R^{iv}$, and $R^{iv}$ is an alkylene dioxolane radical of the formula

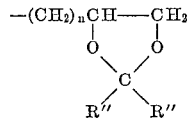

wherein $R''$ is selected from the class consisting of $-CH_3$ and $-C_2H_5$ and $n$ is an integer having a value of 1 to 4 inclusive.

2. The process of decreasing the solubility of a thermoplastic polymer comprising an unsaturated carboxylic acid ester of a substituted alkylene dioxolane, which comprises subjecting said polymer to a radiant energy source in the 500 to 5000 angstrom region, wherein the polymer is the polymerization product of a mixture comprising a monomeric ester having the formula

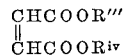

in which $R'''$ is selected from the group consisting of H, saturated aliphatic hydrocarbon radicals containing from one to eight carbon atoms and $R^{iv}$, and $R^{iv}$ is an alkylene dioxolane radical of the formula

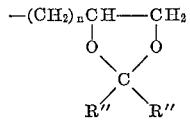

wherein $R''$ is selected from the class consisting of $-CH_3$ and $-C_2H_5$ and $n$ is an integer having a value of 1 to 4 inclusive.

3. The process of decreasing the solubility of a thermoplastic copolymer comprising an unsaturated carboxylic acid ester of a substituted alkylene dioxolane and at least one other monomer containing a $CH_2$=$C<$ group, which comprises subjecting said copolymer to a radiant energy source in the 500 to 5000 angstrom region, wherein the ester has the formula

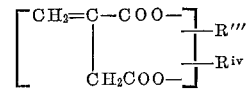

in which $R'''$ is selected from the group consisting of H, saturated aliphatic hydrocarbon radicals containing from one to eight carbon atoms and $R^{iv}$, and $R^{iv}$ is an alkylene dioxolane radical of the formula

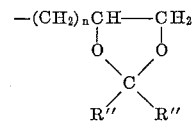

wherein $R''$ is selected from the class consisting of $-CH_3$ and $-C_2H_5$ and $n$ is an integer having a value of 1 to 4 inclusive.

4. The process of decreasing the solubility of a thermoplastic polymer comprising an unsaturated carboxylic acid ester of a substituted alkylene dioxolane and at least one other monomer containing a $CH_2$=$C<$ group, which comprises subjecting said copolymer to a radiant energy source in the 500 to 5000 angstrom region, wherein the ester has the formula

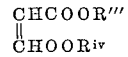

in which $R'''$ is selected from the group consisting of H, saturated aliphatic hydrocarbon radicals containing from one to eight carbon atoms and $R^{iv}$, and $R^{iv}$ is an alkylene dioxolane radical of the formula

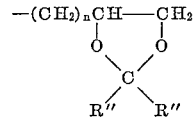

wherein $R''$ is selected from the class consisting of $-CH_3$ and $-C_2H_5$ and $n$ is an integer having a value of 1 to 4 inclusive.

5. The process of decreasing the solubility of a thermoplastic copolymer comprising an itaconic acid ester of glyceryl ketal and at least one other monomer containing a $CH_2$=$C<$ group, which comprises subjecting said copolymer to a radiant energy source in the 500 to 5000 angstrom region.

6. The process of claim 5 in which the other monomer is styrene.

7. The process of claim 1 in which a portion of the polymer is masked and protected from exposure to the source of radiant energy.

8. The process of claim 2 in which a portion of the polymer is masked and protected from exposure to the source of radiant energy.

References Cited by the Examiner

UNITED STATES PATENTS

| | | | |
|---|---|---|---|
| 2,320,536 | 6/1943 | Pollack et al. | 204—158 |
| 2,680,735 | 6/1954 | Fegley | 260—86.1 |
| 2,877,215 | 3/1959 | Fang | 260—86.1 |
| 2,929,710 | 3/1960 | Martin | 204—158 |

MURRAY TILLMAN, *Primary Examiner.*

JOHN H. MACK, *Examiner.*